United States Patent [19]
Tatara et al.

[11] 3,924,030
[45] Dec. 2, 1975

[54] METHOD FOR PRODUCTION OF GLASS-FORMING MATERIALS

[75] Inventors: Seiji Tatara, Tokyo; Shozo Iwasa, Takaoka; Shuichi Komura, Bandai, all of Japan

[73] Assignee: Nippon Soda Company, Ltd., Tokyo, Japan

[22] Filed: Aug. 16, 1973

[21] Appl. No.: 388,828

Related U.S. Application Data

[63] Continuation of Ser. No. 208,169, Dec. 15, 1971, abandoned, which is a continuation-in-part of Ser. No. 58,739, Feb. 27, 1970, abandoned.

[52] U.S. Cl. ........... 427/213; 427/215; 106/DIG. 8; 106/52; 65/27
[51] Int. Cl.$^2$............................................ C03C 1/02
[58] Field of Search ...... 117/100 S, DIG. 6; 106/52; 65/27

[56] References Cited
UNITED STATES PATENTS

| | | | |
|---|---|---|---|
| 3,081,180 | 3/1963 | Korinov | 106/52 |
| 3,451,831 | 6/1969 | Miche | 106/52 |
| 3,503,790 | 3/1970 | Gringras | 117/100 S |
| 3,529,979 | 9/1970 | Yarsa | 106/52 |

FOREIGN PATENTS OR APPLICATIONS

| | | | |
|---|---|---|---|
| 887,032 | 1/1962 | United Kingdom | 106/52 |

*Primary Examiner*—Patrick P. Garvin
*Assistant Examiner*—Mark Bell
*Attorney, Agent, or Firm*—George B. Oujevolk

[57] ABSTRACT

Forming a fluidized bed of silica sand with a $CO_2$ containing gas having a flow rate of 60 cm/sec to 150 cm/sec at a temperature of about 300°C to about 700°C, recycling into the fluidized bed the grains and dust carried by the fluidizing gas and caught by the dust collector, spraying an aqueous sodium hydroxide solution having a concentration of from about 40% to about 70% over the fluid bed of silica grains, feeding grains of silica into the under part of the fluid bed on the upper part of an tuyere inclined plate, and extruding finished glass-forming materials from the under part of the fluid bed.

6 Claims, 1 Drawing Figure

U.S. Patent  Dec. 2, 1975  3,924,030
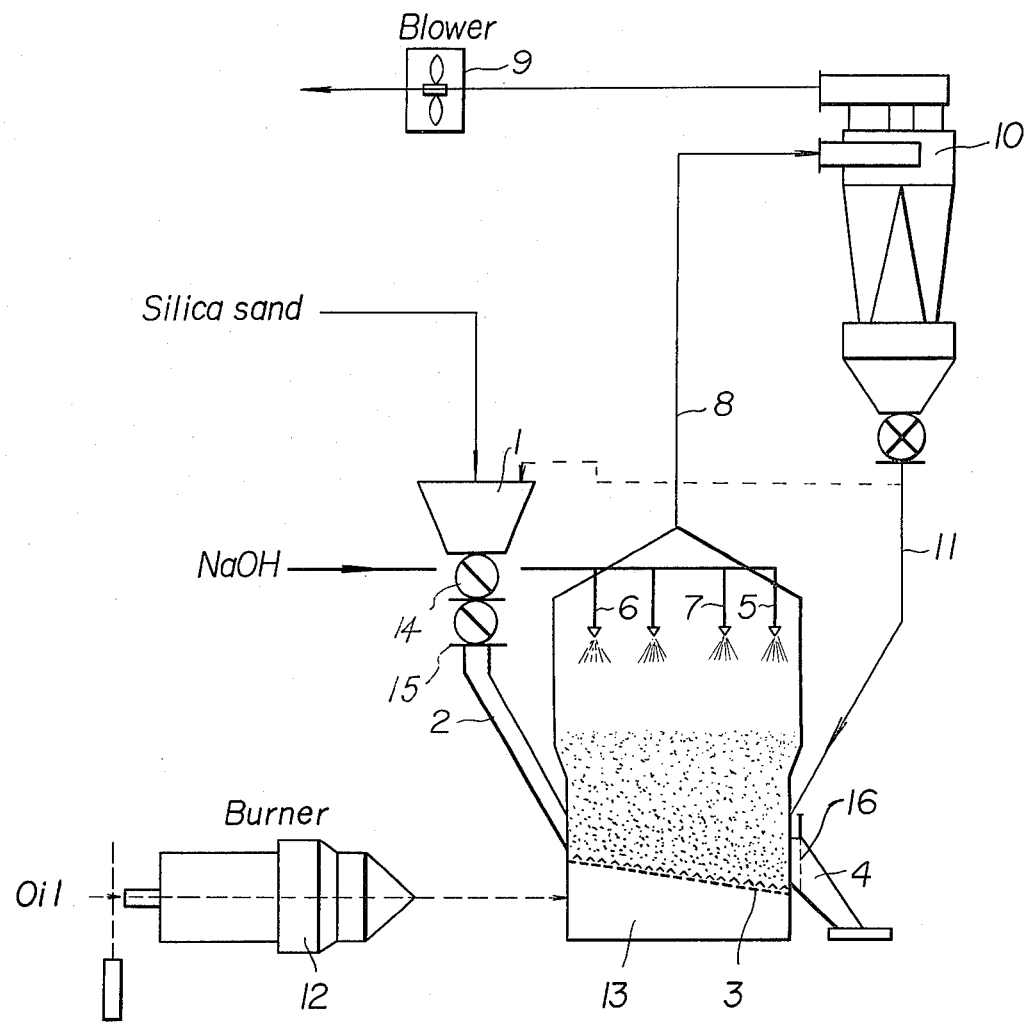

3,924,030

METHOD FOR PRODUCTION OF GLASS-FORMING MATERIALS

BACKGROUND OF THE INVENTION

This is a continuation of application Ser. No. 208,169, filed Dec. 15, 1971, now abandoned, which is a continuation-in-part of application Ser. No. 58,739, filed Feb. 27, 1970, now abandoned.

This invention relates to methods of making glass-forming material, and more particularly concerns granules having a silica core surrounded by a sodium carbonate layer or by a sodium metasilicate layer and a sodium carbonate layer, which cause no dust in the vitrification step.

BRIEF DESCRIPTION OF THE PRIOR ART

In the manufacture of glass or cullet for water glass, it has been proposed to vitrify pellets containing some kinds of glass-forming raw materials such as silica, sodium carbonate and calcium carbonate together. However, in the methods of the prior art, it is very difficult to contact silica with an alkali component sufficiently, and it takes a long time to vitrify the pellets without leaving unreacted silica particles and sometimes material segregation occurs. It has been know to use granules which are made by reacting grains of silica with molten sodium hydroxide. In such a method, the period for vitrification can be shortened, but on the other hand, an alkali component which is partially contained in the state of free alkali on the surface of the granules corrodes the vitrification furnaces.

In U.S. Pat. No. 3,529,979, glass-forming granular material having a sodium carbonate layer surrounding the grain of silica or a sodium metasilicate layer and a sodium carbonate layer surrounding the grains of silica, and the method for production of the glass-forming material are described. According to the method of production of this patent, a fluid type reactor is shown in the patent and the finished glass-forming materials obtained in the fluid type reactor have a relatively small diameter of grain size and the glass-forming materials cause dust in the vitrification furnaces. Since the dust adheres on the heat exchanger of the vitrification furnaces, the heat exchange efficiency deteriorates.

OBJECTS OF THE INVENTION

It is an object of this invention to provide a method for producing glass-forming materials which do not cause dust in the vitrification furnaces.

It is another object of this invention to provide a method for producing glass-forming materials which show no alkali corrosion and no material segregation.

It is still another object of the invention to provide a method for producing glass-forming materials which can be vitrified in a short period of time.

SUMMARY OF THE INVENTION

Thus, the present invention comprises forming a fluidized bed of silica sand with a $CO_2$ containing gas having a flow rate of 60 cm/sec to 150 cm/sec at a temperature of about 300°C to about 700°C, recycling into the fluidized bed the grains and dust carried by the fluidizing gas and caught by the apparatus dust collector, spraying an aqueous sodium hydroxide solution having a concentration of from about 40% to about 70% over the fluid bed of silica grains, feeding grains of silica into the under part of the fluid bed on the upper part of an tuyere inclined plate and extruding finished glass-forming materials from the under part of the fluid bed.

The invention as well as other objects and advantages thereof will be more apparent from the following detailed description when taken in conjunction with the accompanying drawing in which:

BRIEF DESCRIPTION OF THE DRAWING

FIG. 1 represents a diagrammatic illustration of a fluid bed reactor according to the inventive concept.

DETAILED DESCRIPTION

In FIG. 1, a hopper 1 for dried silica sand is connected to a feed pipe 2 which introduces the silica sand onto the tuyere plate 3. The tuyere plate 3 is inclined downward from the feed pipe 2 to outlet pipe 4, preferably at an angle of from 1° to 7°. In the upper part of fluidized bed reactor nozzles 5, 6, or 7, for spraying aqueous sodium hydroxide solution downward, are provided. Gas exchange pipe 8 is connected to blower 9 via the dust collector 10 and pipe 11 for recycling dust is connected to the reactor or the hopper 1. Burner 12 is connected to combustion chamber 13.

In the operation, hot combustion gas produced by combustion, containing from 4% to 15% by volume of $CO_2$ is introduced into the fluid bed reactor through the tuyere plate with a combustion gas nozzle in order to heat and fluidized the silica sand. A combustion gas at about 700°C to about 1,200°C may preferably be employed and the fluidized bed can be maintained at about 300°C to about 700°C, preferably at 380°C to 420°C. Dried silica sand is introduced from the hopper via a measure 14 and dumper 15 into the lower part of the fluidized bed, preferably just on the tuyere plate, spread on the tuyere plate and fluidized by the combustion gas. Retention time of the silica sand in the fluidizing bed is about 30 minutes to 2 hours. The gases are compulsory discharged from the fluidized bed reactor by means of a blower. Fine dust carried by the exit gas is separated from the gas by a collector, such as a cyclone, and recycled into the fluid bed reactor directly, or into the hopper for silica sand with the dried silica sand.

An aqueous solution of sodium hydroxide having a concentration of more than 40% to 70%, preferably 40% to 60%, is sprayed downward with a scattering angle of about 30° on the fluidized bed through nozzles from the upper part of the fluidized bed reactor. Finished glass-forming material is extruded from the bottom of the fluidized bed through the outlet via shutter 16. To maintain a long run operation without trouble, the flow rate of fluidizing gas is 60 cm/sec to 150 cm/sec, preferably 90 cm/sec to 110 cm/sec, and silica sand having less than 2–3 mm average grain size can be employed, preferably silica sand having a diameter of 0.5–1.0 mm average grain size can be employed.

In the invention, the dried silica sand contacts the hot gas stream at first and is heated advantageously to a high temperature. Then, the heated silica sand contacts an aqueous solution of sodium hydroxide and is allowed to react with the sodium hydroxide and is covered with a sodium metasilicate and sodium carbonate layer, or a sodium carbonate layer which is produced by the reaction between sodium hydroxide and the $CO_2$ contained in the fluidizing combustion gas.

In the prior art, when the silica sand was fed to the upper part of the fluidized bed and an aqueous sodium solution was sprayed into the fluidized bed, the combustion gas at high temperature at first contacted the aqueous sodium hydroxide solution, and the temperature of the gas was lowered and the gas contacted the silica sand so that the silica sand which makes the core of the granules of glass-forming material was not heated sufficiently to react properly.

However, in the present invention, the combustion gas is first contacted with the silica sand and then the aqueous sodium hydroxide solution so that the silica sand can be heated to a high temperature. In this process the grains of silica contact with droplets of sodium hydroxide and the surfaces of the grains are covered with sodium hydroxide and the reaction between silica and sodium hydroxide occurs at the surface of the grains of silica, and simultaneously the sodium hydroxide surrounding the grains of silica is carbonated with carbon dioxide gas. The ratio of the silica component in the finished glass-forming materials is optionally changed to the desired ratio according to the objective desired.

The finished glass-forming materials having a mole ratio of 0.5–6.0 of $SiO_2/Na_2O$ are preferably used for glass-forming materials and granules having a mole ratio of 0.5–1.0 of $SiO_2/Na_2O$ are preferred for materials of the alkali source in glass. Granules with a mole ratio of 2–3 of $SiO_2/Na_2O$ are for raw materials for water glass cullet, and granules with a mole ratio of 4–6 $SiO_2/Na_2O$ are for raw materials for glass articles. If necessary, other glass-forming materials or adducts such as potassium nitrate, borax, feldspar and coloring agents can be added to the silica sand or aqueous sodium hydroxide solution in order to exist in the layer.

Silica grains having a diameter smaller than about 0.1 mm have a tendency to be blown away and are sometimes carried over to the collector without the reaction being completed. However, by recycling the grains of silica carried over into the reactor directly into the fluidizing bed, or with silica sand, the grains grow into large granules by agglomerations and can be taken out as granules having a preferred diameter.

Granules, as glass-forming materials in this invention, contain no free alkali, have a preferred diameter of 0.15–3 mm, contain less than 1% of fine particles such as 100 mesh (ASTM) or under, and do not show hygroscopicity, or dusting and material segregation in a vitrification step.

A still further advantage of the invention is that the grains of silica are closely contacted with sodium metasilicate and/or sodium carbonate and the vitrification temperature can be lowered to about 200°C and the period required for glass-forming can be shortened over the period required for tablets made with silica and sodium carbonate by mechanical pelletizing. This is especially so when a sodium metasilicate layer is formed between the surface of a grain of silica and the sodium carbonate layer in the granules.

It is to be observed that since ordinary air contains in volumetric proportions, 4 volumes nitrogen, 1 volume oxygen, 0.9 volumes argon, 0.3 volumes carbon dioxide, some water vapor and other minor constituents, the expression "carbon-dioxide containing gas" used herein means air with the carbon dioxide content raised to from about 4% to about 15% by volume. It is of course possible to vary the other constituents in numerous ways. The important feature being of course that the gas acts as a combustion gas under the reaction conditions.

EXAMPLES

For the purpose of giving those skilled in the art a better understanding of the invention, the following illustrative examples are given:

EXAMPLE 1

An apparatus described above with respect to FIG. 1 was employed and the apparatus had a fluidized bed reactor 610 mm in diameter × 800 mm in height, a combustion chamber 610 mm in diameter × 650 mm, a tuyere plate inclining 5° to the horizontal and eight nozzles in the reactor.

28.2 litre/hour of 48.5% of NaOH aqueous solution was sprayed on the fluidized bed and 46.5 kg/hour of silica sand having grain size distribution as shown in Table 1 were fed into the reactor, 13.0 litre/hour of kerosene was burnt and the temperature of the combustion chamber was maintained at around 680°C and the temperature of the fluidized bed was around 340°C and had a height of 650 mm. The pressure of the fluidized bed reactor was maintained at around 310 mm.$H_2O$, the flow rate of the fluidizing gas stream was 95 cm/sec, retention time of the silica sand was around 1.5 hours, dust obtained in the cyclone was 22 kg/hour and recycled in the silica sand, and then the finished product of 66.0 kg.hour was obtained.

The finished product obtained was granulated as shown in Table 1 and had no tendency to become dust.

Table 1

| Silica Sand (ASTM) (Mesh) | (%) | Finished Glass-Forming Materials Mesh | % |
|---|---|---|---|
| 16 up | 4.0 | 16 up | 1.6 |
| 16 – 35 | 15.0 | 16 – 35 | 70.5 |
| 35 – 45 | 23.8 | 35 – 45 | 16.4 |
| 45 – 60 | 25.1 | 45 – 60 | 8.3 |
| 60 – 80 | 15.4 | 60 – 80 | 2.6 |
| 80 – 120 | 9.5 | 80 – 120 | 0.5 |
| 120 – 170 | 2.3 | 120 under | 0 |
| 170 under | 0.0 | | |
| ($Na_2O : SiO_2 = 1 : 3$) | | | |

EXAMPLE 2

The same apparatus used in Example 1 was employed and 27 litre/hour of 48.5% of NaOH aqueous solution was sprayed on the fluidized bed, 30.3 g/hour of silica sand having grain distribution as shown in Table 2 were fed into the reactor, 13.7 litre/hour of kerosene was burnt and the temperature of the combustion chamber was maintained at around 680°C and the temperature of the fluidized bed was 340°C. The flow rate of the fluidizing gas stream was 110 cm/sec and retention time of the silica sand was 2.0 hours. Dust obtained in the cyclone was 9.0 kg/hour and recycled in silica sand, and a finished product of 50 kg/hour was obtained.

The finished product obtained was granulated as shown in Table 2 and had no tendency to become dust.

Table 2

| Silica Sand (ASTM) Mesh | % | Finished Glass-Forming Material Mesh | % |
|---|---|---|---|
| 16 up | 3.5 | 16 up | 32 |
| 16 – 35 | 16.5 | 16 – 35 | 67.7 |
| 35 – 45 | 20.7 | 35 – 45 | 11.3 |
| 45 – 60 | 23.1 | 45 – 60 | 5.9 |
| 60 – 80 | 15.7 | 60 – 80 | 2.1 |
| 80 – 120 | 12.4 | 80 – 120 | 0.4 |

Table 2-continued

| Silica Sand (ASTM) | | Finished Glass-Forming Material | |
|---|---|---|---|
| Mesh | % | Mesh | % |
| 120 – 170 | 6.1 | 120 under | 0.1 |
| 170 under | 2.50 | | |
| ($Na_2O : SiO_2 = 1 : 2$) | | | |

EXAMPLE 3

The same apparatus used in Example 2 was employed and 35 litre/hour of 48.5% of NaOH aqueous solution was sprayed on a fluidized bed, 20.8 g/hour of silica sand having grain size distribution as shown in Table 3 were fed into the reactor, 12.7 litre/hour of kerosene was burnt and the temperature of the combustion chamber was maintained at around 680°C and the temperature of the fluidized bed was 340°C. The flow rate of the fluidizing gas stream was 100 cm/sec and retention time of the silica sand was 1.5 hours. Dust obtained in the cyclone was 11 kg/hour and recycled in silica sand, and a finished product of 47.5 kg/hour was obtained.

The finished product obtained was granulated as shown in Table 3 and had no tendency to become dust.

Table 3

| Silica Sand (ASTM) | | Finished Glass-Forming Material | |
|---|---|---|---|
| Mesh | % | Mesh | % |
| 16 up | 1.0 | 16 up | 2.4 |
| 16 – 35 | 15.6 | 16 – 35 | 4.7 |
| 35 – 45 | 20.9 | 35 – 45 | 24.8 |
| 45 – 60 | 24.4 | 45 – 60 | 0.8 |
| 60 – 80 | 17.1 | 60 – 80 | 0.1 |
| 80 – 120 | 12.9 | 80 under | 0.0 |
| 120 under | 8.1 | | |
| ($Na_2O : SiO_2 = 1 : 1$) | | | |

EXAMPLE 4

The same apparatus used in Example 1 was employed and 18.4 litre/hour of 48.5% of NaOH aqueous solution was sprayed on the fluidized bed, 30.3 g/hour of a mixture of silica sand having grain size distribution as shown in Table 2, containing 20% of $CaCO_3$ and 30% of $NaNO_2$ was fed into the reactor, 137 litre/hour of kerosene was burnt and the temperature of the combustion chamber was maintained at around 680°C and the temperature of the fluidizing bed was 350°C. The flow rate of the fluidized gas stream was 100 cm/sec and retention time of the silica sand was 1.5 hours. Dust obtained in the cyclone was 13.7 kg/hour and recycled in silica sand, and a finished product of 66.5 kg/hour was obtained.

The finished product obtained was granulated as shown in Table 4 and had no tendency to become dust.

Table 4

| Silica Sand (ASTM) | | Finished Glass-Forming Material | |
|---|---|---|---|
| Mesh | % | Mesh | % |
| 16 up | 0.6 | 16 up | 6.4 |
| 16 – 35 | 18.9 | 16 – 35 | 51.1 |
| 35 – 45 | 19.8 | 35 – 45 | 29.5 |
| 45 – 60 | 24.5 | 45 – 60 | 14.2 |
| 60 – 80 | 16.4 | 60 – 80 | 0.8 |
| 80 – 120 | 12.7 | 80 under | 0.0 |
| 120 under | 7.1 | | |

Table 4-continued

| Silica Sand (ASTM) | | Finished Glass-Forming Material | |
|---|---|---|---|
| Mesh | % | Mesh | % |
| ($Na_2O : SiO_2 = 1 : 2$) | | | |

EXAMPLE 5

An apparatus described above with respect to FIG. 1 was employed and the apparatus had a fluidized bed reactor 4000 mm in diameter × 2000 mm in height, a combustion chamber 4000 mm in diameter × 3000 mm in height, a tuyere plate inclining 5° to the horizontal and eight nozzles in a reactor. 1,000 litre/hour of 48.5% of NaOH aqueous solution and 1,700 kg/hour of silica sand having a grain size distribution as shown in Table 5 was fed into the reactor. The temperature of the fluidizing bed was 340°C and exit gas volume was 3.5 – 3.6 $m^3$/sec and finished glass-forming material was obtained at a rate of 2,600 kg/hour.

The finished product obtained was granulated as shown in Table 5 and had no tendency to become dust.

Table 5

| Silica Sand (ASTM) | | Finished Glass-Forming Materials | |
|---|---|---|---|
| Mesh | % | Mesh | % |
| 16 up | 5.4 | 16 up | 1.6 |
| 16 – 35 | 24.7 | 16 – 35 | 51.1 |
| 35 – 45 | 24.7 | 35 – 45 | 27.5 |
| 45 – 60 | 16.4 | 45 – 60 | 19.2 |
| 60 – 80 | 8.27 | 60 – 80 | 0.8 |
| 80 under | 13.3 | 80 under | 0.0 |

EXAMPLE 6

(Comparison of vitrification period)—The granules gained in Example 1 were compared with a previous material which was made by merely mixing silica sand and sodium carbonate at the same $SiO_2/Na_2O$ mole ratio. Both samples in each crucibles were heated in an electric oven. The temperature was elevated to 1,100°C for 40 minutes and then was kept at 1,100°C for 1 hour. The vitrification condition was compared with the naked eyes. The granules of this invention were vitrified in a semi-transparent state and were fluidized. On the other hand, the previous material which had been prepared for comparison purposes, was in a wettish powder state and was not fluidized.

EXAMPLE 7

The vitrification test was repeated, as shown in Example 6, for granules of 1 : 2 of $Na_2O:SiO_2$ mole ratio gained in Example 2. The granules were completely vitrified in a transparent state and were fluidized. On the other hand, the previous material which was made by mixing silica and sodium carbonate which had the same $Na_2O:SiO_2$ mole ratio of 1:2 was in a semi-transparent state with many silica particles and was hardly fluidized.

EXAMPLE 8

(Moisture absorption test)—The granules which were produced in accordance with Example 2 were tested.

Samples of granules of this invention, sodium carbonate and sodium silicate were allowed to stand for a long time in contact with air having a relative humidity of 80% at room temperature. The result was as follows:

Table 6

| Our invention | $Na_2O/SiO_2$ mole ratio | Lapse time (hour) and hygroscopic degree (%) | | | |
|---|---|---|---|---|---|
| | | 24 hrs. | 48 hrs. | 72 hrs. | 96 hrs. |
| 1 (fluidized at 400°C) (for comparison) | 2.00 | 7.5 (%) | 11 (%) | 17 (%) | 21 (%) |
| 1 Sodium Carbonate | — | 7.5 | 15 | 16 | 22 |
| 2 Sodium silicate | 2.0 | 14.0 | 29 | 45 | 71 |

Granules of this invention have the same hygroscopicity as sodium carbonate has.

EXAMPLE 9

(Coagulation test)—Four kinds of granules having a $SiO_2/Na_2O$ mole ratio of 1.53, 1.78, 1.67 and 2.0, which were made in accordance with Example 2 were tested.

Test method: Silica sand containing 10% of water was added and mixed into 600 g of the granules to the extent that the $Na_2O:SiO_2$ mole ratio became 0.2. The prepared samples were packed airtight in polyethylene film bags and permitted to stand for 4 days at room temperature.

Results: When the samples were loosely packed in bags, coagulation did not occur. When the samples were closely packed in bags, coagulation occurred, but coagulations could be easily broken down in particles by pressing with fingers.

We claim:

1. A method of preparing dustless glass-forming materials having a silica core surrounded by a sodium carbonate layer, which comprises:
   a. fluidizing silica sand having less than 2 – 3 mm average grain size in a fluid bed reaction zone by passing gas containing from about 4% to about 15% by volume $CO_2$ through a tuyere plate inclined at 1° to 7° downwards from one end to the other end of said zone to form a fluidized bed of silica sand over said tuyere plate, maintaining said fluidized bed at a temperature from 300°C to 700°C by introducing said gas at a temperature of about 700°C to about 1,200°C into said fluid bed reaction zone through said tuyere plate at 60 cm/sec to 150 cm/sec;
   b. simultaneously and uniformly spraying an aqueous sodium hydroxide solution in a ratio of silica sand to sodium hydroxide of 0.5 to 6 mole ratio of $SiO_2/Na_2O$ from the upper portion of the reaction zone into the fluidized bed of silica sand;
   c. continuously feeding silica sand into the lower portion of said fluidized bed and onto the top surface of the inclined tuyere plate from said one end of said zone and removing said glass-forming materials from the lower portion of said fluidized bed from the other end of said zone while the hot gases passing through the fluidized bed from the tuyere plate and escaping from the upper portion of said zone are passed through a collection zone and the grain and dust in the escaping gas collected therein; and,
   d. recycling back into said fluidized bed said grain and dust collected in said collection zone.

2. The method of claim 1 in which said aqueous sodium hydroxide solution has a concentration of 40% to 70%.

3. The method of claim 1 in which said fluidized bed is maintained at a temperature of 380°C to 420°C.

4. The method of claim 1 in which the retention time of said silica sand in said fluid bed reaction zone is 30 minutes to 2 hours.

5. The method of claim 1 in which said gas is introduced through said tuyere plate at 90 cm/sec to 110 cm/sec.

6. The method of claim 1 in which said silica sand has an average grain size of 0.5 to 1.0 mm.

* * * * *